Aug. 11, 1925

Re. 16,139

M. J. WIGHTMAN

UNDERFEED FURNACE

Original Filed May 26, 1919 2 Sheets-Sheet 1

Inventor
Merle J. Wightman
By
Merrell E. Clark
Attorney

Aug. 11, 1925.

Re. 16,139

M. J. WIGHTMAN

UNDERFEED FURNACE

Original Filed May 26, 1919 2 Sheets-Sheet 2

Inventor
Merle J. Wightman
By Merrell E. Clark
Attorney

Reissued Aug. 11, 1925.

Re. 16,139

UNITED STATES PATENT OFFICE.

MERLE J. WIGHTMAN, OF WEST NEW BRIGHTON, NEW YORK, ASSIGNOR TO DOMESTIC STOKER COMPANY, OF NEW YORK, N. Y., A CORPORATION OF DELAWARE.

UNDERFEED FURNACE.

Original No. 1,454,697, dated May 8, 1923, Serial No. 299,805, filed May 26, 1919. Application for reissue filed February 28, 1924. Serial No. 695,836.

*To all whom it may concern:*

Be it known that I, MERLE J. WIGHTMAN, a citizen of the United States, and resident of West New Brighton, in the county of Richmond and State of New York, have invented certain new and useful Improvements in Underfeed Furnaces, of which the following is an exact and clear description.

My invention relates to improvements in underfeed furnaces and to improvements in automatically operated mechanical devices for supplying coal and air to such furnaces, and the object of my improvement is to provide a furnace which is capable of consuming coal efficiently and of securing practically perfect combustion of the coal regardless of the rate at which the coal is fed to the furnace.

Another object is to provide means for regulating the rate at which the coal is fed to the furnace and automatic means for regulating the supply of air in the correct proportion to the supply of coal, it having been found that the relative proportions of coal and air vary for different rates of feeding.

A further object is to provide openings at a plurality of different points in the fire pot between the top and bottom thereof through which air for the purpose of combustion may be admitted, such fire pot having devices therein for rotating the coal and being provided with a stationary spiral thread for working live coals from the top of the pot downwardly into the body of the coal to ignite the main body of the coal and commence the gasification and distillation of such coal so that it will be in a proper state for combustion when it reaches the point at which the actual combustion takes place.

Still further objects are to provide a furnace that is particularly well adapted to be constructed in small sizes for domestic use and one that is provided with an electric ignition system for lighting the fire in the fire pot.

The invention consists in the novel construction, adaptation and combination of interdependent parts of a mechanically stoked, underfeed furnace as will be more clearly hereinafter described and claimed.

Figure 1:
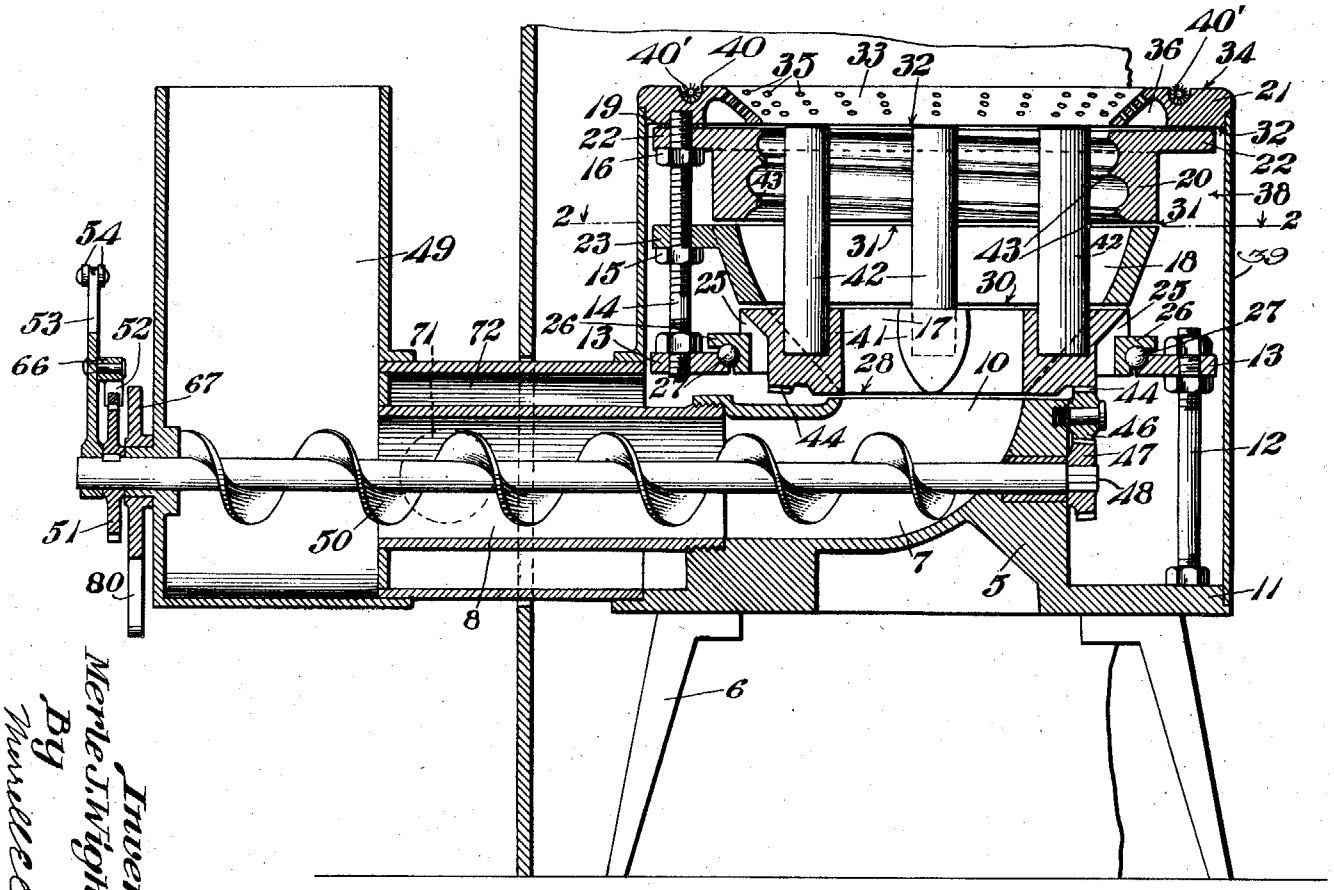
Figure 2:
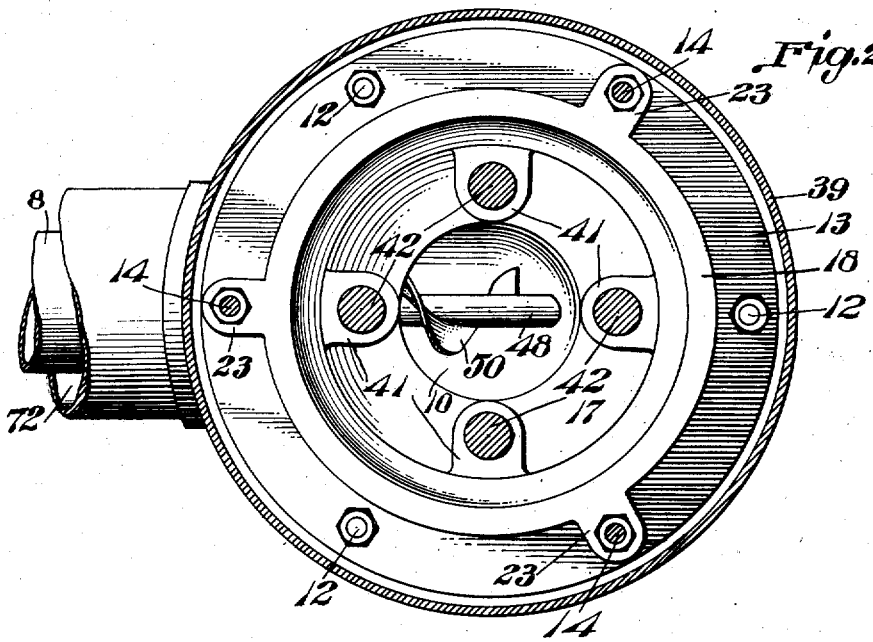
Figure 3:
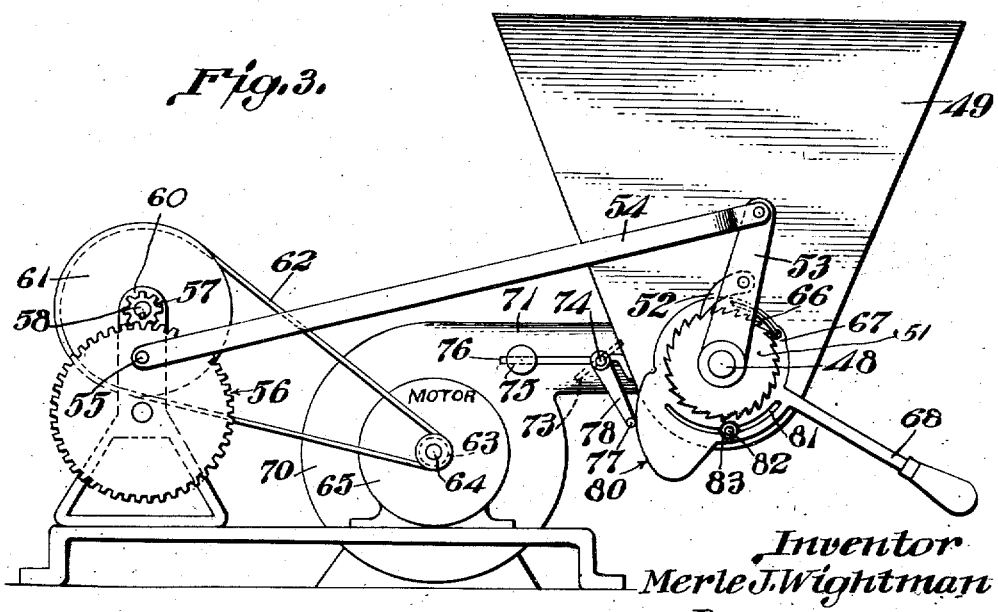

In the accompanying drawings Figure 1 is a view in vertical mid section of a furnace constructed in accordance with my invention, certain parts being shown in elevation and other parts being omitted. Fig. 2 is a view in cross section on broken line 2—2 of Fig. 1, certain parts being shown in plan; and Fig. 3 is a view in side elevation of the mechanically actuated coal and air feed mechanism.

Like reference numerals designate like parts throughout the several views.

Referring to the drawings the numeral 5 designates the base of a fire pot which may be mounted on supports 6 and is provided with a horizontal fuel inlet passageway 7 that is connected at one end with a tubular fuel inlet pipe 8 and terminates at its other end in an opening 10 disposed in the top of the base member and arranged centrally with respect to the fire pot.

The base 5 is provided with a flange 11 to which are rigidly secured three or more equidistantly spaced rigid upright posts 12 that serve to support an annular track member 13. The track member 13 is in turn provided at points mid-way between the posts 12 with three or more other posts 14 that project upwardly therefrom and are threaded for the reception of nuts 15 and 16 which serve to support a medial fire pot section 18 and an upper fire pot section 20. A lower fire pot section 17 is supported for rotation on the track member 13 as hereinafter described and a cap member 21 is arranged to rest upon washers 19 that space it slightly from the upper fire pot section 20 and is secured against displacement by the ends of the posts 14 which project upwardly thereinto.

The upper fire pot section 20 is provided around its upper edge with an externally disposed annular flange 22 that is adjustably supported upon the nuts 16. The medial fire pot section 18 is provided with external lugs 23 that are perforated to fit over the posts 14 and are adjustably supported on the nuts 15. The lower fire pot section 17 is supported for rotation on the annular track member 13 which is adjustably supported on the posts 12, and such lower fire pot section 17 is connected by rigid brackets 25 with an annular bearing member 26 or angular cross sectional shape that is mounted for rotary movement on bearing balls 27 that are disposed within a suitable ball race in the inner edge of the track member 13.

By the arrangement just described the several sections of the fire pot are supported in slightly spaced relation to afford adjustable air inlet passageways therebetween, the lower fire pot section 17 being separated by an air space 28 from the base member 5, the medial fire pot section 18 being separated by an air inlet space 30 from the lower section 17, the top fire pot section 20 being separated by an air inlet space 31 from the medial section and the cap member 21 being separated by an air inlet space 32 from the upper fire pot section 20. The air inlet openings 30 and 31 each extend entirely around the fire pot and may be adjusted as to width by adjusting the nuts on the posts 12 and 14.

The cap member 21 is provided with an angular or beveled surface 33 which gives a flaring effect to the top of the fire pot and which merges into a horizontal shelf 34 over which the ashes may be discharged. The angular wall 33 is provided with a plurality of small perforations 35 that communicate with an air chamber 36 in the cap member, the air chamber 36 communicating with a larger air chamber 38 by means of the passageway 32 which is of such narrow width as to have the effect of reducing the air pressure in the chamber 36.

The outer wall of the air chamber 38 is formed by an annular drum 39 that extends between and is tightly connected with the peripheral portion of the cap 21 and the peripheral portion of the flange 11.

The horizontal shelf 34 at the top of the cap member 21 is provided with an annular groove 40 wherein is disposed an electric igniter 40′ which may be caused by the passage of current therethrough to become highly heated and to ignite the coal that is in contact therewith thereby constituting a simple and efficient means for lighting the fire.

The interior of the lower fire pot section 17 is provided at a plurality of points with lugs 41 that are recessed for the reception of vertical posts 42 which project upwardly substantially to the plane of the upper edge of the upper fire pot section 20 and cause the coal in the fire pot to be rotated in unison with the lower fire pot section 17. In practice four of the posts 42 have been found to give very good results although it is obvious that either a greater or less number may be used if desired.

The upper fire pot section 20 is provided with a rigid internal spiral ledge or screw thread 43 arranged so that when the rotating coal comes in contact therewith the coals on the outer edge of the body of rotating coal will be depressed or worked downwardly toward the center of the fire pot by the thread and will serve to ignite the main body of coal before it reaches the top of the fire pot.

The lower fire pot section 17 is provided with an annular gear rack 44 that meshes with an idler gear 46 which, in turn, meshes with a pinion 47 on the end of a shaft 48 which extends lengthwise axially within the tube 8 and passageway 7 and is journaled in the base member 5.

The shaft 48 is provided with a fuel conveyor screw 50 and projects through a hopper 49 wherein coal may be placed.

The shaft 48 is arranged to be rotated at a comparatively slow rate of speed by mechanism shown in Fig. 3, wherein 51 designates a ratchet wheel that is rigid on the shaft 48 and adapted to be engaged by a pawl 52 on an arm 53 the lower end of which is loosely pivoted on the shaft 48 and the upper end of which is articulated with one end of a link 54 whose other end is connected with a crank pin 55 on a gear wheel 56 that is arranged to mesh with a small pinion 57 on a shaft 58. The shaft 58 is mounted in brackets 60 and carries a relatively large, fixedly mounted belt pulley 61 that is connected by a belt 62 with a relatively small belt pulley 63 on the shaft 64 of a motor 65.

The engagement of the pawl 52 with the teeth of the ratchet wheel 51 is controlled by a dog 66 that is arranged to rest on the teeth of the ratchet wheel 51 and one end of which is pivoted to a plate 67 that is provided with a handle 68 by which it may be moved about a central pivot to adjust the position of the dog 66. As the pawl 52 is moved back and forth by oscillation of the arm 53 it will ride over the dog 66 and will only engage the teeth of the ratchet wheel 51 when it drops off of the end of the dog 66. Hence if the dog is moved in a contraclockwise direction as viewed in Fig. 3, it will lift the pawl for a greater portion of its stroke and will retard the turning of the shaft 48 and vice versa if the dog 66 is moved in a clockwise direction far enough so that it will not engage with and lift the pawl at all a maximum turning effect of the shaft in response to a given oscillation of the arm 53 will be produced.

Any desired means may be used for holding the plate 67 so that it will not move after it has been adjusted to a desired position, as for instance, said plate may have an arcuate slot 81 through which protrudes a bolt 82 that is rigid with the hopper 49 and has a nut 83 that may be tightened against the plate.

Air for purposes of combustion is supplied by a rotary fan within a housing 70 which is connected by a tubular conduit 71 with an air passageway 72 that surrounds the coal feed tube 8 and communicates with the air chamber 38 around the fire pot. The fan in the housing 7 may be connected with the motor shaft 64 whereby it may be driven.

The passage of air through the conduit 71 may be controlled by a butterfly valve 73 that is mounted on a shaft 74 and is arranged to be adjusted by the combined action of a weight 75 on a lever arm 76 and a pin 77 on another lever arm 78, the said pin being arranged to engage a cam surface 80 on the plate 67 whereby when the plate is moved to reduce the speed of rotation of the shaft 48 that governs the coal feed the valve 73 will be closed by the action of the weight 75 and when the plate is moved to increase the speed of rotation of the shaft 48 the butterfly valve 73 will be opened.

In practice it has been found that the relative proportion of coal and air are not constant, as the rate at which these two elements are fed to the furnace is increased or decreased but that as the feed of coal to the furnace increases the proportional feed of air decreases and vice versa. For instance, if the feed of coal to the furnace is doubled it may only be necessary to increase the feed of air by one half to secure the best results. The cam 80 is so shaped as to cause the correct adjustment of the air when the feed of coal is increased or diminished.

In operation the fire pot and passageways leading from the coal hopper thereto are normally filled with coal. When it is desired to produce a fire, current may be admitted to the electric igniter 40′ to light the coal at the top of the fire pot and the motor 65 may be started to feed coal and air and to rotate the body of coal in the fire pot. The coal will ignite around the top edges and the fire will very quickly spread over the entire top of the firepot which will become a glowing mass of coals.

As the mass of coal is rotated some of the live coals from the top will be caught beneath the screw thread 43 and moved downwardly thereby toward the center of the fire pot where they will serve to ignite the upwardly moving mass of coal so that by the time the coal reaches the top of the fire pot it will be in condition for substantially perfect combustion and will burn with intense heat and practically no soot and smoke.

The arrangement of the air inlets in cascade formation and the automatically balanced forced air and fuel feed system insures that there will be a sufficient supply of air at all points to properly unite with the carbon in the coal and form the gases most conducive to perfect combustion.

The narrow passageway 32 through which air passes from the large air chamber 38 to the smaller air chamber 36 in the cap member 21 serves to reduce the pressure in the chamber 36 and prevent too strong a draft through the openings 35, thereby constituting means for supplying air at different pressures to air passageways located at different elevations with respect to the fire pot.

The intermittent movement of rotation of the body of coal, the action of the posts 42 and the impingement of the coal on the screw thread 43 keep the coal broken up and prevent the formation of any clinkers that might otherwise have a tendency to form.

This apparatus is particularly well adapted to be constructed in small units for the use in heating homes but it will be understood that the same may be constructed in larger sizes if desired.

It is obvious that changes in the form of construction and arrangement of the various parts of this device may be resorted to within the scope of the following claims.

What I claim is:

1. An underfeed furnace comprising a circular fire pot, means for feeding fuel upwardly into said fire pot and means for effecting the depression within said fire pot of the peripheral portion of the fuel.

2. An underfeed furnace of the class described comprising a circular fire pot, means for feeding fuel upwardly within said fire pot, means for effecting the rotation of such fuel and means cooperating with said last mentioned means for causing the downward movement of the peripheral portion of the said fuel.

3. An underfeed furnace comprising a fire pot, means for effecting the rotation of a body of fuel within said fire pot, and a rigid spiral rib on the interior of said fire pot for engaging with and depressing portions of said rotating body of fuel.

4. In an underfeed furnace a sectional fire pot comprising rigid upper sections and a rotatable lower section, projecting devices on said rotatable lower section for rotating the body of coal in said fire pot and a spiral thread on said upper fixed section for directing coals on the peripheral portion of said rotating body of coal downwardly.

5. In an underfeed furnace, a fire pot comprising rigidly mounted upper sections, a rotatably mounted lower section having a central opening, means for feeding coal upwardly through said central opening, posts rigid with said rotatable lower section and arranged to project upwardly into said upper sections, an internal spiral thread on one of the rigidly mounted upper sections and means for rotating said lower section whereby the coal in said upper sections will be rotated in such a direction that portions of the same impinging on said spiral thread will be depressed.

6. In an underfeed furnace a fire pot formed of a plurality of superimposed sections supported in slightly spaced apart relation to leave narrow annular air inlet passageways therebetween, and means for adjusting said sections to vary the size of said air inlet passageways.

7. A furnace of the class described comprising a stationary base member, a lower fire pot section supported for rotation and spaced a slight distance above said base member, a medial fire pot section rigidly supported at a slight distance above said base section, an upper fire pot section rigidly supported at a slight distance above said medial section and means for adjusting the spaces between all of said sections.

8. An underfeed furnace comprising a fire pot formed of a plurality of superimposed sections independently and adjustably supported in slightly spaced apart relation one above another to leave relatively narrow annular air inlet passageways therebetween, means for feeding coal upwardly into said fire pot, a jacket surrounding said fire pot sections and spaced therefrom to form an air chamber, and means for introducing air under pressure into said air chamber.

9. In an underfeed furnace the combination with a fire pot, of means for forcing fuel upwardly through said fire pot and an electric igniting element disposed at the upper peripheral edge of said fire pot and arranged to ignite the fuel.

10. An underfeed furnace comprising a fire pot, means for feeding fuel into said fire pot and supporting it therein, means for producing a relative rotary motion between the fuel and the fire pot, and means distinct from the feeding and supporting means and cooperating with said last mentioned means for effecting the depression within the fire pot of heated pieces of such fuel.

11. An underfeed furnace comprising a fire pot, means for feeding fuel into said fire pot and supporting it therein, means for effecting the rotation of such fuel, and means distinct from the feeding and supporting means and cooperating with said last mentioned means for effecting the depression within said fire pot of heated pieces of such fuel.

MERLE J. WIGHTMAN.